United States Patent [19]

Knapp et al.

[11] 4,372,068
[45] Feb. 8, 1983

[54] RECHARGEABLE TRANSPARENT SLIDE VIEWER APPARATUS

[75] Inventors: Paul A. Knapp, Tempe, Ariz.; Frederick A. Major, 1725 E. Ellis Dr., Tempe, Ariz. 85282

[73] Assignee: Frederick A. Major, Tempe, Ariz.

[21] Appl. No.: 174,737

[22] Filed: Aug. 4, 1980

[51] Int. Cl.³ .................... G02B 27/02; G02B 27/04; G03B 21/20; G02B 7/02

[52] U.S. Cl. ........................ 40/367; 40/365; 40/362; 40/464; 353/85; 350/250; 350/577

[58] Field of Search ............... 40/362, 367, 361, 366, 40/365, 364, 464; 353/43, 27 R, 74, 75, 76, 78, 77, 85; 350/70, 78, 250, 255, 75

[56] References Cited

U.S. PATENT DOCUMENTS

| | | | |
|---|---|---|---|
| 535,862 | 3/1895 | Sawyer | 350/78 |
| 1,943,533 | 1/1934 | Hübschmann | 353/85 |
| 2,206,865 | 7/1940 | David et al. | 40/362 |
| 2,239,032 | 4/1941 | Boch | 40/367 |
| 2,419,339 | 4/1947 | Dennis | 40/367 |
| 2,513,576 | 7/1950 | Luray | 40/367 |
| 2,646,637 | 7/1953 | Nierenberg et al. | 40/367 |
| 2,720,045 | 10/1955 | Miller | 40/367 |
| 2,805,500 | 9/1957 | Dixler | 40/367 |
| 3,143,035 | 8/1964 | Morgan | 353/85 |
| 3,283,650 | 11/1966 | Shoemaker | 353/85 |
| 4,082,440 | 4/1978 | Bennett | 353/43 |

Primary Examiner—Gene Mancene
Assistant Examiner—Michael J. Foycik, Jr.
Attorney, Agent, or Firm—H. Gordon Shields

[57] ABSTRACT

Apparatus for viewing a transparency includes a rechargeable battery and a telescoping lens housing which moves inwardly and outwardly with respect to a housing in which is disposed the rechargeable battery, a light source, and a solid diffuser/reflector block for diffusing and reflecting light from the light source over substantially the entire area of the transparency.

11 Claims, 21 Drawing Figures

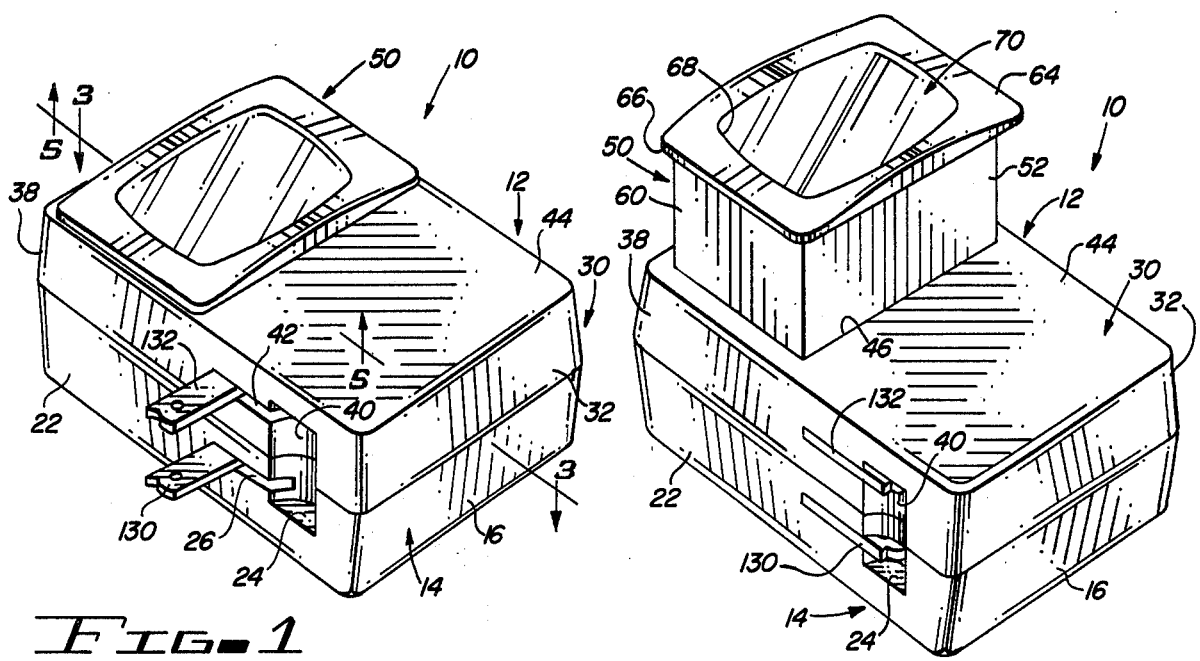
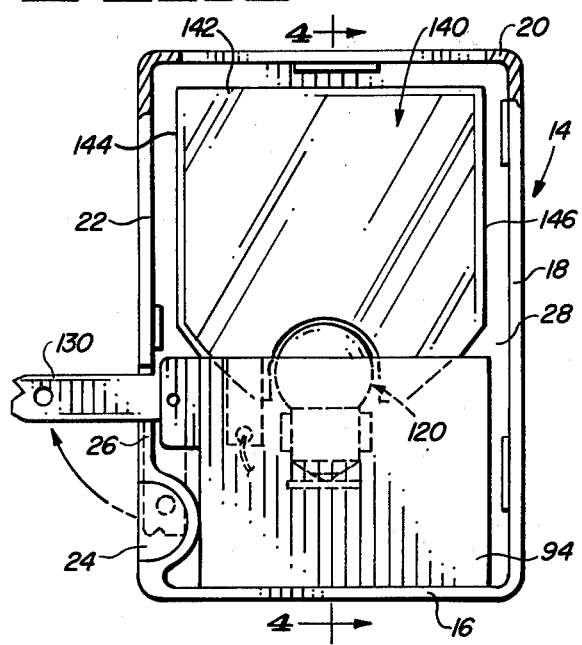
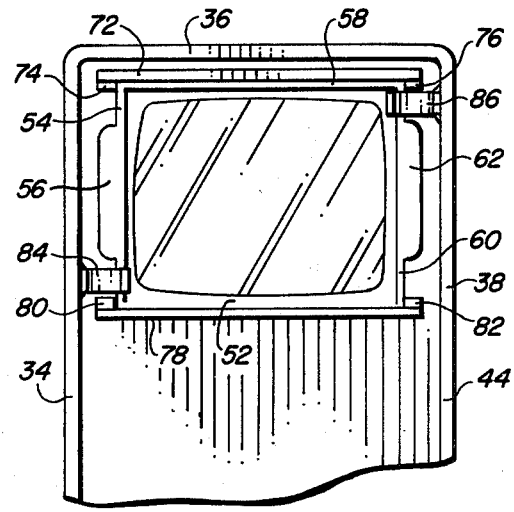
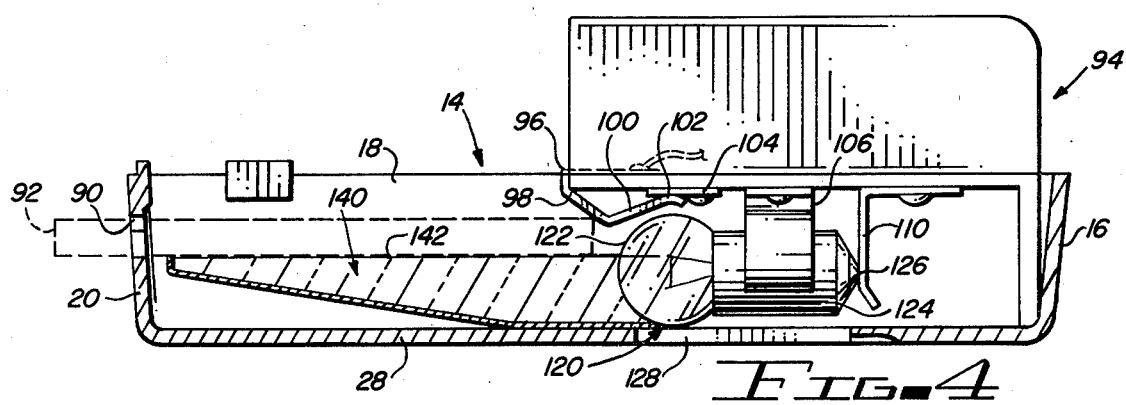

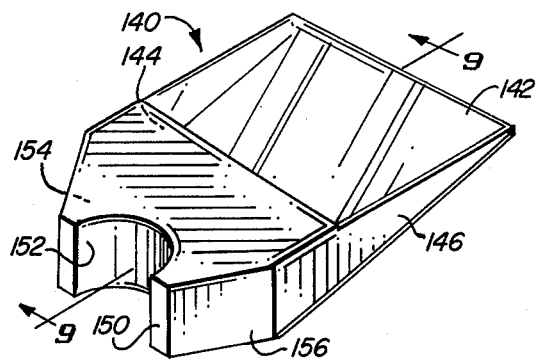
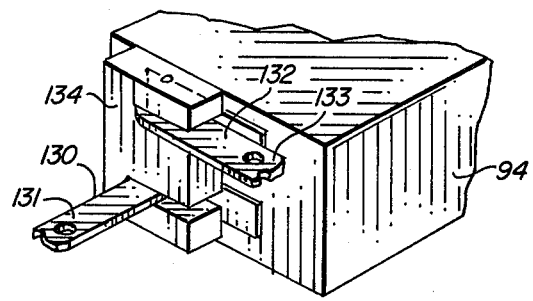
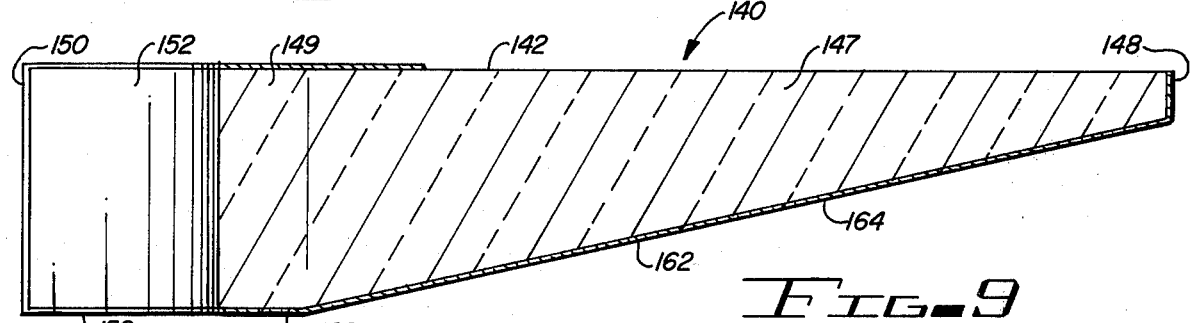
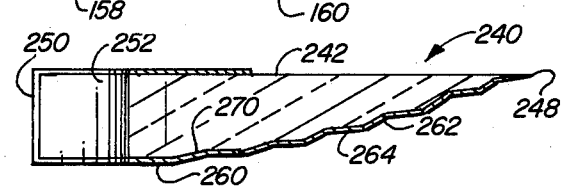
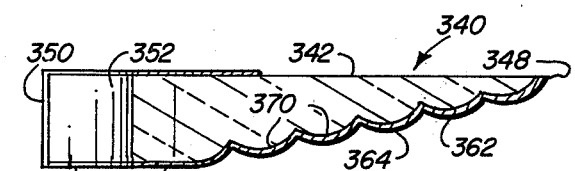
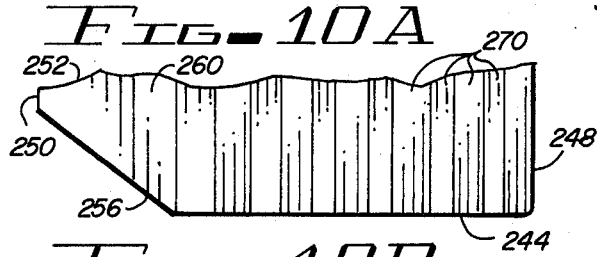
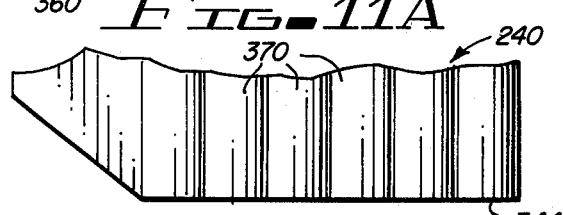
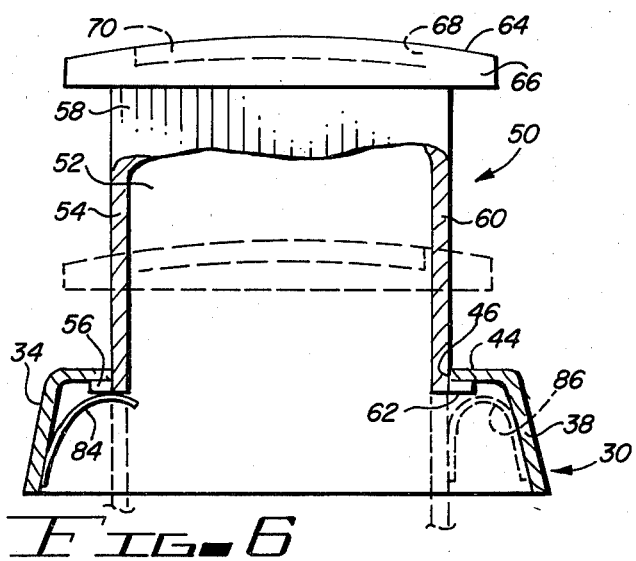
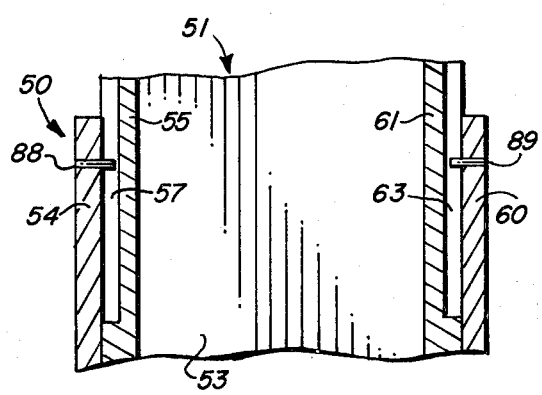

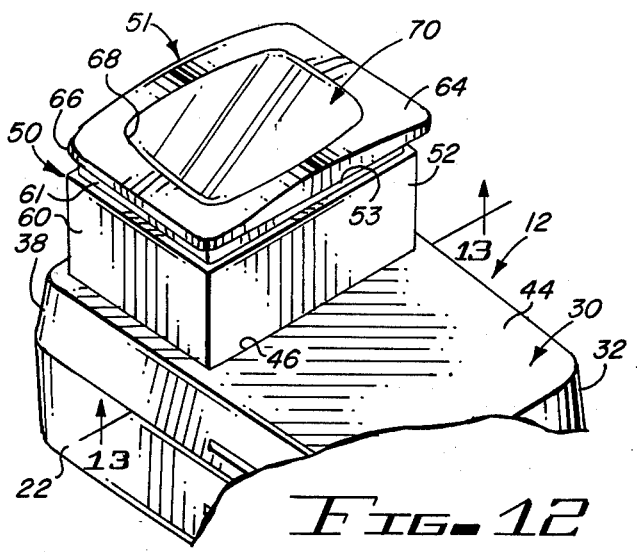

RECHARGEABLE TRANSPARENT SLIDE VIEWER APPARATUS

BACKGROUND OF THE INVENTION

1. Field of the Invention:

The apparatus of the present invention relates to transparent slide viewer apparatus and, more particularly, to slide viewer apparatus having a rechargeable battery and which is compact, relatively inexpensive to manufacture, and which distributes light evenly over substantially the entire area of a slide or transparency.

2. Description of the Prior Art:

Slide viewer apparatus of the prior art comprises many different types, most of which include four standard components. One of the standard components is a housing in which a light source is located, and which receives a transparency or slide. The second standard component is a lens for enlarging the slide, usually a thirty-five millimeter slide, to produce an image substantially larger than the original slide. The third common element is a light source disposed behind the slide for illuminating the slide. The fourth component is a light diffuser disposed adjacent the light source for diffusing the light from the lamp over the slide. Typically the diffuser is simply a piece of frosted glass.

There are typically three types of electrical systems for such slide viewer apparatus, one comprising simply a common dry cell, the life of which is relatively short. A second type of light source is a bulb which may be plugged into an ordinary 115 volt household electrical system. The third type of electrical system includes a rechargeable battery, which offers the best features of the two electrical systems just mentioned. The rechargeable battery electrical system may simply be plugged into an ordinary household 115 volt outlet for recharging the battery, and the user is accordingly free from the problems of continually purchasing new dry cell when the cells or batteries lose their power.

Another inherent problem with prior art slide viewing systems is the provision of an adequate light source which provides a substantially uniform area of illumination which coincides with the area of a slide. Various types of diffusers have been used with a single light source, but regardless of the type of diffuser elements used in the prior art, the slide is illuminated unevenly.

In the prior art slide viewing systems, the diffuser is disposed between the light source and the slide. Since the light source is a filament in a bulb or lamp, it is difficult to diffuse the light evenly over an area which is substantially larger than the filament. The filament, for all practical purposes, comprises a single point light source. The provisions of a diffuser of the prior art between the single point source of light and the slide virtually inherently results in uneven illumination of the slide.

The apparatus of the present invention overcomes the problems of the prior art by interposing a solid diffuser/reflector block between the light source and the slide, adjacent the light source, but not in direct alignment between the light source and the slide. The diffuser block in turn conducts and reflects the light from the light source from a wide surface area directly onto and through the transparency for substantially uniform or even illumination of the transparency.

SUMMARY OF THE INVENTION

The apparatus disclosed and claimed herein includes a rechargeable battery connected to a light source, and a solid diffuser/reflector block which conducts and diffuses the light from the light source over an area in a relatively even manner, and the diffused light is projected through a transparency to illuminate substantially the entire area of the transparency for viewing, and the apparatus includes a telescoping lens housing which moves into and out of the housing which contains the light source and the diffuser block.

Among the objects of the present invention are the following:

to provide new and useful transparency viewing apparatus;

to provide new and useful transparency viewing apparatus having a rechargeable battery;

to provide new and useful transparency viewing apparatus having a solid diffuser block between a light source and a transparency;

to provide new and useful transparency viewing apparatus in which the transparency is oriented ninety degrees from the light source;

to provide new and useful transparency viewing apparatus which is compact and relatively inexpensive;

to provide new and useful transparency viewing apparatus with diopter correction;

to provide a new and useful housing for a transparency which seals out dust when the housing is not being used; and to provide new and useful transparency viewing apparatus having a telescoping lens housing.

BRIEF DESCRIPTION OF THE DRAWING

FIG. 1 is a perspective view of the apparatus of the present invention.

FIG. 2 is a perspective view of the present invention showing a telescoping lens housing extended to its open position.

FIG. 3 is a view in partial section of a portion of the apparatus of FIG. 1 taken generally along line 3—3 of FIG. 1.

FIG. 4 is a view in partial section of a portion of the apparatus of FIG. 3 taken generally along line 4—4 of FIG. 3.

FIG. 5 is a view in partial section of a portion of the apparatus of FIG. 1 taken generally along line 5—5 of FIG. 1.

FIG. 6 is a view in partial section of a portion of the apparatus of the present invention showing the telescoping lens housing in its extended position.

FIG. 7 is an enlarged perspective view illustrating the folding plug contacts used to connect the apparatus to a household electrical circuit.

FIG. 8 is a perspective view of the diffuser block used in the present invention.

FIG. 9 is a view in partial section of the diffuser block apparatus of FIG. 8 taken generally along line 9—9 of FIG. 8.

FIG. 10A is a view in partial section of an alternate embodiment of the diffuser block of FIGS. 8 and 9.

FIG. 10B is a bottom view of the diffuser block of FIG. 10A.

FIG. 11A is a view in partial section of an alternate embodiment of the diffuser block of FIGS. 8, 9, 10A, and 10B.

FIG. 11B is a bottom view of a portion of the diffuser block of FIG. 11A.

FIG. 12 is a perspective view of a portion of an alternate embodiment of the lens housing of the present invention.

FIG. 13 is a view of the apparatus of FIG. 12, taken generally along line 13—13 of FIG. 12.

FIG. 14 is a perspective view of an alternate embodiment of the diffuser/deflector block of FIGS. 8 and 9.

FIG. 15 is a view in partial section of the apparatus of FIG. 14, taken generally along line 15—15 of FIG. 14.

FIG. 16 is a view in partial section of an alternate embodiment of the diffuser/deflector block of FIG. 10.

FIG. 17 is a view in partial section of an alternate embodiment of the diffuser/reflector block of FIG. 11.

FIG. 18 is a view in partial section illustrating the telescoping lens housing and the diopter bellows of FIGS. 12 and 13.

FIG. 19 is an enlarged view in partial section of a portion of the apparatus of FIG. 18.

DESCRIPTION OF THE PREFERRED EMBODIMENT

FIG. 1 is a perspective view of rechargeable slide or transparency viewer apparatus 10. The slide or transparency viewer apparatus 10 includes a housing 12 and a lens housing 50 which extends into, or nests inside of, the housing 12. FIG. 2 is a perspective view of the slide or transparency viewer apparatus 10 showing the lens housing 50 extended to its open position. The lens housing 50 is shown in FIG. 1 in its closed or nested position.

The housing 12 includes two portions, a bottom half 14 and an upper half 30. In FIGS. 1 and 2, the two halves of the housing 12 are shown secured together.

Electrical plug contacts 130 for a rechargeable battery are shown in their open position in FIG. 1, ready for insertion into an electrical outlet. The contacts are shown in FIG. 2 in their closed position.

FIG. 3 is a top view of the lower or bottom half 14 of the housing 12 taken generally along line 3—3 of FIG. 1. FIG. 4 is a view in partial section of the bottom half 14 of the housing 12 taken generally along line 4—4 of FIG. 3. FIG. 5 is a view of the upper half 30 of the housing 12 taken generally along line 4—4 of FIG. 3. FIG. 5 is a view of the upper half 30 of the housing 12 taken generally along line 5—5 of FIG. 1. FIG. 6 is an enlarged view in partial section of the upper half 30 of the housing 12, showing the lens housing 50 extended to its open position.

For the following discussion concerning the housing 12, attention will be directed primarily to FIGS. 1, 2, 3, and 4. For discussion of the lens housing 50, and its relationship to the housing 12, reference will be made primarily to FIGS. 2, 5, and 6.

The bottom half 14 of the housing 12 of the viewer apparatus 10 includes a lower end wall 16, a side wall 18, an upper end wall 20, and a second side wall 22. The side wall 22 includes a semi-circular recess 24 which extends concavely into the interior of the housing half 14. Communicating with the recess 24 is a slot 26. The recess 24 and the slot 26 cooperate to receive a pivotable plug contact 130 associated with a rechargeable battery 94 (see FIGS. 3 and 4) and will be discussed in detail below.

The bottom half 14 also includes a bottom wall 28 which is secured to the end walls 16 and 20 and to the side walls 18 and 22. As is shown in FIGS. 1, 2, and 4, the various walls of the housing define a generally rectangular housing half, but the walls are curved or angled with respect to each other to comprise an attractive package which is easily fabricated, preferably of an appropriate plastic (polymer) material.

The upper half 30 of the housing 12 mates with the bottom half 14 to comprise the housing 12, as shown in FIGS. 1 and 2. The upper half 30 includes a lower end wall 32, a side wall 34, an upper end wall 36, and a second side wall 38 (see FIG. 5). The side wall 38 includes a concave recess 40 which extends inwardly with respect to the side wall 38, and a slot 42 which communicates with the recess 40. The recess 40 and its communicating slot 42 cooperate with a pivotable plug contact 132, which is part of the battery recharging system, as mentioned above.

The upper housing half 30 also includes a top wall 44, which is secured to the four respective side and end walls. The top wall 44 also includes a generally rectangular aperture 46 which receives the lens lousing 50. The lens housing 50 is movably disposed within the aperture 46.

With the housing halves 14 and 30 secured together, as by mating tabs and recesses (see FIGS. 3 and 4), which are well known and understood, the housing 12 comprises a unitary entity or element, with the respective side walls and end walls engaged in a mating orientation to define the unitary whole. As shown in FIGS. 1 and 2, the respective recesses 24 and 40, with their communicating slots 26 and 42 of the lower and upper housing halves, respectively, are in substantial parallel engagement with respect to each other so that the plug contacts 130 and 132 are in a generally parallel relationship with respect to each other.

The lens housing 50, shown in FIGS. 2 and 6 in its open or extended position, includes a bottom wall 52, a side wall 54, a top or upper wall 58, and a second side wall 60. The side walls 54 and 58 are generally parallel to each other, and the bottom wall 52 and the top wall 58 are substantially parallel to each other, thus defining a generally rectangular housing. The four walls of the lens housing, including the bottom wall 52, the side wall 54, the top wall 58, and the side wall 60, are dimensioned so as to fit substantially snugly in the rectangular aperture 46 which extends through the top wall 44 of the upper housing half 30. While there need not be a tight fit between the aperture 46 and the walls of the lens housing, there should be at least a relatively snug fit for maximum efficiency of the apparatus, as will be discussed below.

Covering the lens housing 50 is a cover 64. The cover 64 is secured to the four walls of the lens housing. The cover 64 also includes an outer flange 66 which is slightly larger than the aperture 64, thus defining a stop which limits the inward movement of the lens housing 50 into the main housing 12 of the viewer apparatus 10.

The outward movement of the lens housing 50 is limited by a pair of flanges 56 and 62 which are secured respectively to the side walls 54 and 60. The flanges 56 are 62 are best shown in FIGS. 5 and 6. The flanges 56 and 64 define stops which abut the adjacent portions of the top wall 44 of the upper housing 30 adjacent the four sides of the aperture 46.

The lens housing 50 is held in its outer or open position, such as shown in FIGS. 2 and 6, by a pair of leaf springs 84 and 86, also best shown in FIGS. 5 and 6. One end of each leaf spring 84 and 86 is secured to its adjacent wall 34 and 38, respectively. As shown in FIG. 5, leaf spring 84 is secured to the wall 34 adjacent the juncture of the bottom wall 52 and the side wall 54 of the lens housing 50. The spring 84 is biased directly against the wall 54 away from the stop flange 56. The leaf spring 86 is secured to the wall 38 and is biased against the side wall 60 of the lens housing 50 adjacent the juncture of the side wall 60 and the top or upper wall 58 of the lens housing. The spring 86 does not interfere with the stop flange 62, secured to the side wall 60, but rather is between the stop flange 62 and the top or upper wall 58.

When the lens housing is in its closed or nested position, such as shown in FIG. 1, the springs 84 and 86 are curved against their respective side walls 54 and 60, as shown in FIG. 6 with respect to spring 86. They thus provide an inward bias on the lens housing the help hold it in its closed position. As the lens housing 50 is moved outwardly with respect to the housing 12, the walls of the lens housing remain in contact with the springs. When the lens housing reaches its outermost extended or open position, as shown best in FIG. 6, the springs 84 and 86 provide a bias against the inner end of the lens housing 50 by being disposed directly against a portion of their respective walls 54 and 60, as shown in FIG. 6 with respect to spring 84. In this manner, the two springs exert a bias to maintain the lens housing 50 in its open or outer position for the proper viewing of a slide.

Movement of the lens housing 50 is guided by a pair of substantially parallel guide bars 72 and 78, best shown in FIG. 5. The guide bar 72 comprises an upper guide bar, disposed against the top or upper wall 58 of the lens housing 50. The guide bar 78 comprises a lower guide bar, disposed against the bottom wall 52 of the lens housing 50. The guide bars 72 and 78 are secured to the inside of the top wall 44 of the upper half 30 of the housing 12, and are, of course, disposed against the respective sides of the aperture 46.

In use, the lens housing 50 is moved outwardly from its closed or nested position, as shown in FIG. 1, to its open or extended position as shown in FIGS. 2 and 6. The upper end wall 20 of the bottom or lower half 14 of the housing 12 includes a slot 90 (see FIG. 4) which is dimensioned to receive a slide. A slide 92 is shown in phantom or dotted line in FIG. 4 extending through the slot 90, and positioned adjacent a front face 142 of a diffuser block 140. The front surface at the bottom edge of the slide 92 is shown engaging against a cam portion 98 of a switch connector 96. The switch connector 96 is in turn secured at one end to an appropriate terminal of the rechargeable battery 94. After initial contact of the cam portion 98, the slide 92 actuates the switch by cam operation of the switch against the front surface of the slide, and not from the edge of the slide, as in the prior art. Since the cam 98 of the switch 96 is inherently biased away from a terminal or contact 104, the front, bottom edge of the slide will make initial contact with the cam 98. After the initial contact, the front face of the transparency will contact the cam portion 98 of the switch 96.

The cam portion 98 of the switch connector 96 is connected to an arm 100 which is in turn secured to a wiper portion 102. The cam arm portion 98 extends inwardly, with respect to the bottom half 14 of the housing, while the arm portion 100 extends outwardly toward the conductive block or terminal 104. The terminal 104 is connected through a bulb 120 to the battery 94. This completes the electrical circuit through the battery 94 and bulb or lamp 120 to cause the lamp to be illuminated, as discussed below.

The cam arm portion 98, with its connected angularly extending arm portion 100 and the wiper 102, are spring biased inwardly with respect to the lower housing 14, towards the lamp 120. In FIG. 4 the wiper 102 is in electrical contact with the conductive terminal 104. The electrical contact between the wiper 102 and the terminal 104 is due to the camming action of the front side of the transparency 92 against the cam arm 98. While the transparency is in place, the electrical circuit is closed because the camming action of the transparency is sideways, or laterally, and is not downwardly. The latter (downwardly) camming action, typical of the prior art, requires pressure against the top of the transparency to maintain an electrical circuit, while the present apparatus does not. With the slide 92 withdrawn from the apparatus, or not making contact with the cam arm 98, the wiper 102 is biased out of electrical contact with the terminal 104. This results in an open electrical contact when a slide is not in place in the viewer apparatus 10. However, when a slide is inserted through the slot 90 and into the housing 12, the slide, by the camming action, causes the wiper 102 to contact the terminal 104.

The terminal 104 is electrically connected to a bulb holder 106. The bulb holder 106 is in turn electrically connected to the cylindrical base 124 of the lamp 120. The cylindrical portion 124 is received by the bulb holder 106 and thus provides electrical contact between the base 124 of the lamp 120 and one terminal of the rechargeable battery 94 when the wiper 102 is in contact with the terminal 104.

The electrical circuitry is completed by electrical contact between a base terminal 126 of the lamp 120 and a bulb connector terminal 110 which is connected to the second (or "other") terminal of the rechargeable battery 94.

The lamp 120 includes a bulb portion 122 which becomes lit or illuminated when the electrical circuitry of the apparatus is completed by the camming action of the slide 92 against the arm 98 of the switch connector 96. Since the lamp 120 is in electrical contact with one terminal of the rechargeable battery 94 by means of the electrical connection between the base terminal 126 and the bulb connector terminal 110, and the cylindrical base 124 is in direct contact with the bulb holder 106, the switch connector 96 closes and opens the electrical circuit to cause the lamp to turn on and off only in response to the presence of a slide 92 inserted into the apparatus for viewing.

FIG. 7 is a perspective view of a portion of the rechargeable battery 94, showing the plug contacts 130 and 132 pivotally connected to a base 134 secured to the battery 94. Within the base 134, the contacts 130 and 132 are appropriately connected to the terminals of the battery 94. For normal usage of the slide viewer apparatus 10, as best shown in FIG. 2, the contacts 130 and 132 are nested within the grooves or slots in the two halves of the housing 12.

The plug contacts 130 and 132 include tips 131 and 133, respectively, which are remote from the base 134. The tips 131 and 133, when the battery 94 is secured within the housing 12, are disposed in their aligned slots and recesses 24, 26, and 40, 42, as again best shown in FIG. 2. When the rechargeable viewer apparatus 10 is in normal use, the contacts 130 and 132 are pivoted ninety degrees from their closed, nested, or folded position to their "open" position, as shown in FIG. 1, and inserted into a convenient outlet for recharging. In FIG. 7, the contact 130 is shown in its open position while the contact 132 remains in its closed position. In the open position, the apparatus 10 may be plugged directly into an ordinary household outlet where the contacts 130 and 132 make appropriate electrical connection for recharging the battery 94. The recharging circuitry is well known and understood, and accordingly is not discussed herein.

As discussed above, a slide, such as the slide 92, is inserted into the apparatus 12 through a slot 90. The movement of the slide into position within the apparatus 10 causes the electrical circuitry to be completed to cause the illumination of the lamp 120. When the slide 92 is in viewing position within the apparatus 10, particularly within the bottom half 14, as shown in FIG. 4, and the slide closes the electrical circuitry to cause the lamp 120 to be illuminated, it will be noted that the slide is then disposed against a front face 142 of the solid diffuser/reflector block 140. FIG. 8 comprises a perspective view of the block 140, and FIG. 9 comprises an enlarged view in partial section of the block 140, taken generally along line 9—9 of FIG. 8.

The diffuser/reflector block 140 includes the front face 142 which is generally flat or planar, and which is substantially parallel to the slide 92 when the slide 92 is in viewing position. The block 140 also includes a pair of substantially parallel sides 144 and 146, which are substantially perpendicular to the front face 142.

The block 140 may be divided into two primary portions, an upper portion 147 and a base portion 149 (see FIG. 9). The thickness of the upper portion 147 increases from a minimum at an upper end 148 to a maximum at the juncture of the upper portion 147 and the base 149. The thickness of the base portion is generally uniform. The tapering thickness of the upper portion 147, and the uniform thickness of the base 149, is best shown in FIG. 9.

At the bottom of the base 147 is a bottom face or lower end 150, spaced apart from the upper end 148. The sides 144 and 146 are separated from the lower or bottom face 150 by a pair of lower sides 154 and 156 of the base 149. The sides 154 and 156 extend from the sides 144 and 146, respectively, to the bottom 150 at an angle, as best shown in FIG. 8.

Extending inwardly in the base 149 from the lower end 150 is a semi-circular recess 152. The recess 152 receives the bulb 122, or a substantial portion thereof, of the lamp 120, as best shown in FIG. 4.

Substantially parallel to the front face 142, and extending substantially perpendicularly with respect to the bottom or lower end 150, is a lower back 158. The lower back 158 extends longitudinally, with respect to the block 140, about the same length as the depth of the semi-circular recess 152. This is best shown in FIG. 9. Extending upwardly from the lower back 158, and aligned therewith, is a midback 160. The midback 160 extends forwardly or upwardly from the lower back a length, longitudinally, which coincides with the longitudinal length of the angled lower side portions 154 and 156. The lower back 158 and the midback 160 define the rear portion of the base 149. From the midback 160, an upper back 162 extends at an obtuse angle which intersects the upper end 148. The upper back comprises the rear or bottom of the upper portion 147. A reflective coating or layer 164 coats the entire back portion of the diffuser block 140, including the lower back, the midback, the upper back, and continuing on the upper end 148. The purpose of the reflective coating or layer 154 is to cause the light from the lamp 120 to be reflected from the back through the front face 142 and accordingly into and through the slide 92. With the bulb 122 of the lamp 120 disposed in the recess 152, the light from the bulb is diffused throughout the block 140 and the light accordingly illuminates the slide in a much more even manner than the apparatus of the prior art. The angled faces 154 and 156 may also be coated with a reflective layer, as also may the sides 144 and 146, and the lower portion of the front face 142, to help diffuse additional light into and through the block 140 and onto a transparency disposed against the block.

FIGS. 10A and 10B are views of alternate embodiments of the diffuser/reflector block 140. FIG. 10A comprises a view in partial section through a diffuser/reflector block 200. FIG. 10B comprises a bottom view of the block 240 of FIG. 10A. FIGS. 11A and 11B also comprise views of an alternate embodiment of the block 140 discussed above. FIG. 11A comprises a view in partial section of a diffuser/reflector block 340 and FIG. 11B comprises a bottom view of the block 340.

The general configuration of the diffuser/reflector blocks 240 and 340, respectively, and the diffuser/reflector block 140, are the configurations of the upper rear or back portions of the diffuser/reflector blocks 240 and 340. The block 240 of FIGS. 10A and 10B include the flat, planar front face 242, and a flat bottom or lower end 250. In FIG. 10B, a side 246 is shown which extends between a top or upper end 248 and a lower side 256. The lower side 256 extends at an angle between the side face 246 and the lower or bottom side 250. The bottom of the block 240 includes a lower back 258, and a midback 260, which extend longitudinally with respect to the block 240 a distance corresponding to the longitudinal length of the recess 252 and of the lower sides, including the lower side 256, respectively. From the lower side 260 to the upper or top end 248 is an angled or faceted back 262. The faceted back 262, and the midback 260, are both coated with a reflective layer 264.

The faceted back 262 comprises a plurality of facets or segments 270, each of which is a relatively short, lengthwise, planar segment which extends the full width of the block 240. The facets or segments 270 are flat or planar and are accordingly connected to each other in an obtuse angular orientation with respect to adjacent segments or facets. From the lower back 260 to the upper end 248, the facets 270 of the upper back 262 extend in a generally angular orientation with respect to the front face 242. The light from a bulb, such as the bulb 122, discussed above, is diffused throughout the block 240, and the light which impinges upon the facets or segments 270 is reflected forwardly through the block 240 and generally towards the front face 242.

The diffuser block 340 includes the corresponding portions or elements discussed above in conjunction with diffuser block 240 and diffuser block 140. The primary difference is that the diffuser block 340 includes a scalloped or wavy upper back 362, instead of the straight, generally flat or planar upper back 162 of the diffuser block 140, and the planar, angularly oriented segments 270 of the upper back 262 of the diffuser block 240. The upper back 362 of the diffuser 340 includes a plurality of concave scallops 370. Each scallop extends across the diffuser block the full width between the opposite sides of the block. As with the backs of the diffuser/reflector blocks 140 and 240, a reflective coating 364 is disposed on the back 362 and the lower portion of the front face 342 to reflect light from a bulb disposed within the recess 352 towards the front face 342. The light thus diffused from the bulb through the solid block 340 and impinging on the reflective surface 364 is reflected toward the upper portion of the front face 342 to illuminate a transparency disposed against the upper portion of the front face 342.

It will be noted that the light from the lamp 120 does not directly impinge on the transparency 92. This may be best understood by reference to FIGS. 3 and 4. Accordingly, there is no hot spot against a slide from a bulb filament, as in the prior art. Rather, the light from the lamp 120 is diffused through a solid diffuser/reflector block, which is preferably made of a coherent plastic, such as acrylic, styrene, or the like, and which is not a good conductor of heat. The cool, diffused light is reflected from the reflective coatings on the block to the upper portion of the planar front face of the solid diffuser/reflector block, and outwardly through the transparency to evenly illuminate it. It will be further noted that the only portions of the block 140 not receiving a reflective coating is the upper portion of the front face against which a transparency is disposed, and the lamp recess 152. The other portions of the block, including the entire back, the top edge, the bottom, and the sides, may all be coated to reflect the light through the block so that the light will be diffused relatively evenly through the block to a transparency.

The diffused and reflected light thus evenly illuminates a transparency disposed against the block. Since the block is not a good conductor of heat, the transparency is illuminated with "cool" light and the danger of damage to a transparency resulting from heat is minimized.

Another factor which is important in the provision of light to illuminate a transparency is the current source for the lamp 120. While the rechargeability of the battery 94 is a convenience, there is another aspect of the use of the battery 94 which is of considerable importance. That aspect is the ability of rechargeable batteries to provide substantial current, or their full rated current, for nearly the entire length of time between charges. That is, the current output of the battery is substantially the same until the battery is drained and is in need of recharging. With ordinary dry cells, the current output decreases steadily over the life of the battery.

For the rechargeable batteries presently in relatively common usage, such as nickel-cadmium and silver oxide batteries, the current produced during the life of the batteries provides white light. The white light is preferable for viewing transparencies to the yellow light produced by dry cells due to their decreasing current output. The yellow light causes color changes in the transparencies, and accordingly the white or blue-white light from the rechargeable batteries is preferable for viewing purposes.

With present technology, it appears that the batteries with the superior current output characteristics are rechargeable, and the batteries with the inferior current output characteristics are not rechargeable. The superior current output provides a relatively good, white light for viewing color transparencies, and at the same time the rechargeability provides the convenience of eliminating regular battery purchases.

FIG. 12 is a perspective view of an alternate embodiment of the apparatus of the present invention, comprising a diopter bellows 51 which telescopes into and out of the lens housing 50. FIG. 13 is a view of the apparatus of FIG. 12, taken generally along line 13—13 of FIG. 12. FIGS. 12 and 13 will both be referred to in the following discussion concerning the diopter bellows 51.

The lens housing 50 comprises a pair of housings, an outer housing, comprising the outer walls 52, 54, 58, and 60, discussed above in conjunction with FIGS. 1 and 2, and an inner housing, comprising the diopter bellows 51, both of which are movable relative to each other.

Movably disposed within the four walls of the lens housing 50 is the diopter bellows 51. The diopter bellows comprises a portion of the lens housing, and a plano-convex lens 70 is actually secured to the diopter bellows 51. The diopter bellows 51 includes four walls, which are generally parallel to and aligned with the four walls of the lens housing 50. The four walls include a bottom wall 53, a side wall 55, a top wall 59, and a side wall 61. The four walls 53-61 of the diopter bellows 51 are disposed adjacent the walls 52-60, respectively, of the lens housing 50. The diopter bellows telescopes inwardly and outwardly with respect to the lens housing 50, and independently of the movement of the lens housing.

For pulling or moving the lens housing 50 out of the housing 12, a user exerts an outward force on the flange 66 of the cover 64. The outward force or pull on the flange 66 causes the bellows housing 51 to move outwardly relative to the lens housing 50 before the lens housing 50 moves outwardly relative to the upper half 30 of the housing 12. However, once the upper or outer limit of movement of the diopter bellows 51 has been reached, then movement of the lens housing 50 relative to the housing 12 takes place. The movement of the diopter bellows 51 relative to the lens housing 50 occurs because the diopter bellows 51 is free floating with respect to the lens housing 50. The lens housing 50, on the other hand, is spring biased to both its open and closed or nested positions, as discussed above, by the leaf springs 84 and 86.

Once the bellows housing 50 is moved to its full open position, as shown in FIGS. 6 and 18, the leaf springs 84 and 86 bias the housing in its open position. The diopter housing 51, with its lens 70, may be moved in and out with respect to the lens housing 50 by a user, as required, as shown in FIG. 18. FIG. 18 comprises a view in partial section of the lens housing 50, including the diopter bellows 51, illustrating movement of the diopter bellows.

The purpose of permitting the lens 70 to move relative to the lens housing 50 and also relative to a slide or transparency disposed within the housing 12 is to allow for the diopter correction of an individual's eye. As is typically the situation with respect to slide or transparency viewers, a user of such apparatus who wears corrective lenses (glasses) has a difficult time in viewing a slide or transparency because with his corrective lenses it is difficult for him to place or position the viewer apparatus close enough to his own eye. Thus, with the diopter bellows 51, the lens 70 may be positioned between the user's eye and a transparency for optically correct vision of the user with respect to a transparency. In effect, the lens 70 becomes the corrective lens for an individual user to allow the user's eye to be placed in the correct position relative to both the lens and the transparency.

FIG. 14 comprises a perspective view of an alternate embodiment of the diffuser/reflective block 140 discussed above in conjunction with FIGS. 3, 4, 8, and 9. FIG. 15 comprises a view in partial section of the apparatus of FIG. 14 taken generally along line 15—15 of FIG. 14.

The primary difference between the apparatus of FIGS. 14 and 15 and the apparatus best shown in FIGS. 8 and 9 comprises the addition of a hood 153 which extends over the bulb receiving recess 152, and the extension of the bottom portion 158 across the entire lower back portion of the block 140. The addition of the hood 153 and the solid lower portion 158 cooperate to enclose the recess 152. Accordingly, when a lamp, such as the lamp 120, discussed above, is disposed within the recess 152, the bulb portion 122 of the lamp 120 is substantially enclosed by the diffuser/reflector block 140. With the reflective coating 164 covering the entire block 140, except for the upper portion of the front face 142, against which is disposed a transparency, substantially all of the light produced by the lamp 120 is caught within the solid block 140 and is reflected from the reflective coating 164 within the block 140 to ultimately illuminate the transparency.

The provision of the hood 153 and the solid lower portion 158 for the block 140 thus provides additional solid material in which the light is captured and in which the captured light is diffused, and, by means of the reflective coating 164, by which the captured and diffused light is further reflected and diffused until it exits through the uncoated portion of the front face 142 to provide substantially even, cool illumination for a transparency.

FIG. 16 comprises a view in partial section of an alternate embodiment of the diffuser block 240 of FIGS. 10A and 10B, and FIG. 17 comprises a view in partial section of an alternate embodiment of the diffuser block 340 of FIGS. 11A and 11B. The primary differences between the embodiments shown in FIGS. 16 and 17 and the embodiments of FIGS. 10 and 11, respectively, comprise the addition of hoods 253 and 353, respectively, and the extension of the lower portion of the backs of the blocks across the recesses 252 and 352, respectively, in the embodiments of FIGS. 16 and 17. Thus, the embodiments of FIGS. 16 and 17 are substantially the same, with respect to their alteration, as the block 140 of FIGS. 14 and 15.

FIG. 18, as discussed above, comprises an enlarged view in partial section illustrating the relative motion between the diopter bellows 51 and the lens housing 50. The movement of the diopter bellows 51 has been discussed above, primarily in conjunction with FIGS. 12 and 13.

FIG. 19 comprises an enlarged view in partial section of the lens housing 50 and the diopter bellows 51 illustrating the stop arrangement between the lens housing 50 and the diopter bellows 51.

A pair of slots 57 and 63 extend inwardly into the side walls 55 and 61, respectively, of the diopter bellows 51. The slots 57 and 63 are of sufficient width and of sufficient depth to allow a pair of pins 88 and 89 to extend into the slots, respectively, from the side walls 54 and 60 of the lens housing 50. The pins 88 and 89 are secured to the side walls 54 and 60, and extend inwardly from the walls and into the slots 57 and 61. The length of the slots is sufficient to allow for the proper diopter correction of vision for most users. The bottom or lower end of the slots 57 and 63 comprise stops when they abut the pins 88 and 89, respectively.

The exertion of an outward pull or force on the flanges 66 of the cover 64 of the diopter bellows 51 causes a relative movement of the diopter bellows 51 with respect to the lens housing 50. When the bottom of the slots 57 and 63 contact the stop or limit pins 88 and 89, secured respectively to the walls 54 and 60 of the lens housing 50, the lens housing 50 then moves against the bias of the springs 84 and 86 (see FIG. 6A). A continued pull will result in the engagement of the flanges 56 and 62 of the lens housing 50 contacting the wall 44 of the cover 50, which in turn limits the outer or outward movement of the lens housing 50. At such time as the flanges 56 and 62 contact the wall 44 about the aperture 46 in the wall 44, the leaf springs 84 and 86 again provide a bias against the flanges and accordingly against the lens housing to urge the lens housing to remain in its open position. With the springs maintaining the relative position of the lens housing 50, the bellows 51 may be moved inwardly relative to the lens housing 50. The in and out relative movement of the diopter bellows 51 with respect to the lens housing 50 allows the user to place the lens 70 in the best position with respect to his own eye for viewing a transparency.

Obviously, the inward relative movement of the diopter bellows 51 with respect to the lens housing 50 is limited by the length of the four walls of each of the elements, the stop pins 88 and 89 in their slots 57 and 63, respectively, and the outer flange 66 of the cover 64.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for viewing a transparency having a front surface and an edge adjacent to the front surface, comprising, in combination:
   housing means, including a recess;
   a slot in the housing means for receiving the transparency for viewing;
   a lamp in the housing means, remote from the slot and disposed adjacent to one end of the transparency when the transparency is received into the housing for viewing, for providing light to illuminate the transparency;
   diffuser/reflector means disposed adjacent to the transparency and extending from adjacent to the lamp to adjacent to the slot for diffusing and reflecting the light from the lamp to the transparency;
   electrical means for providing an electric current to the lamp, including
   a rechargeable battery disposed within the housing means,
   a pair of plug contacts disposed in the recess of the housing means connected to the rechargeable battery and pivotable out of the recess and the housing means and insertable into an electrical outlet for recharging the rechargeable battery;

switch means connected to the electrical means including a cam portion movable laterally sideways by the front surface of the transparency adjacent to the edge for selectively connecting the electrical current to the lamp and for maintaining the connection of the electrical current to the lamp until the transparency is removed from the slot; and lens means disposed adjacent to the transparency and including a lens for viewing the transparency.

2. The apparatus of claim 1 in which the lens means includes
   a lens housing movable from a closed position within the housing means to an open position extending outwardly from the housing means, and
   a lens secured to the lens housing through which the transparency is viewed.

3. The apparatus of claim 2 in which the lens means further includes spring means secured to the housing means in the closed position and for biasing the lens housing to the open position, including a leaf spring secured to the housing means and disposed against the lens housing for providing a bias against the lens housing to maintain the lens housing in the open position and curving against the lens housing when the lens housing is in the closed position for providing an inward bias on the lens housing to hold the lens housing in the closed position.

4. The apparatus of claim 1 in which the lens means includes
   an outer lens housing movable relative to the housing means between a closed position and an open position,
   an inner lens housing secured to and movable relative to the outer lens housing, and
   the lens is secured to the inner lens housing and is movable therewith for diopter correction.

5. The apparatus of claim 1 in which the diffuser/reflector means includes a block having
   a front face extending substantially the length of the transparency,
   a back spaced apart from the front face,
   an upper end,
   a lower end remote from the upper end,
   a recess extending into the lower end for receiving a portion of the lamp, and
   a reflective coating for reflecting light from the lamp towards the front face.

6. The apparatus of claim 5 in which the back of the block includes a lower back and an upper back disposed at an obtuse angle with respect to the lower back.

7. The apparatus of claim 5 in which the front face of the block of the diffuser/reflector means comprises a planar front face adjacent and substantially parallel to the transparency.

8. The apparatus of claim 1 in which the diffuser/reflector means includes
   a base portion,
   a recess extending into the base portion for receiving the lamp,
   a front face disposed adjacent the transparency,
   a back portion, and
   a reflective coating on the back portion for reflecting light from the lamp through the diffuser/reflector means to the front face.

9. The apparatus of claim 8 in which the back portion includes a rear face disposed at an angular orientation with respect to the front face for reflecting light to the front face.

10. The apparatus of claim 8 in which the back portion includes a plurality of facets for reflecting light to the front face.

11. The apparatus of claim 8 in which the back portion includes a plurality of concave scallops for reflecting light to the front face.

* * * * *